(12) United States Patent
Sandvik et al.

(10) Patent No.: US 9,712,785 B2
(45) Date of Patent: Jul. 18, 2017

(54) METHOD AND SYSTEM FOR VIDEO CONFERENCING UNITS

(71) Applicant: Cisco Technology, Inc., San Jose, CA (US)

(72) Inventors: Kristian Sandvik, Oslo (NO); Kristian Tangeland, Oslo (NO)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/155,020

(22) Filed: May 15, 2016

(65) Prior Publication Data

US 2016/0286166 A1 Sep. 29, 2016

Related U.S. Application Data

(63) Continuation of application No. 14/669,088, filed on Mar. 26, 2015, now Pat. No. 9,398,258.

(51) Int. Cl.
*H04N 7/14* (2006.01)
*H04N 7/15* (2006.01)
*G06K 9/00* (2006.01)
*H04N 5/247* (2006.01)
*H04L 29/06* (2006.01)

(52) U.S. Cl.
CPC ........... *H04N 7/15* (2013.01); *G06K 9/00228* (2013.01); *H04L 65/4038* (2013.01); *H04N 5/247* (2013.01); *H04N 7/142* (2013.01); *H04N 7/152* (2013.01)

(58) Field of Classification Search
CPC combination set(s) only.
See application file for complete search history.

(56) References Cited

U.S. PATENT DOCUMENTS 7,349,008 B2    3/2008   Rui et al.
8,259,624 B2    9/2012   Schirdewahn
(Continued)

OTHER PUBLICATIONS

"The Cisco Project Workplace Briefing Room" (2014).
(Continued)

*Primary Examiner* — Joseph J Nguyen
(74) *Attorney, Agent, or Firm* — Samual M. Katz

(57) ABSTRACT

In one embodiment a system and method is described, the system and method including a first camera, which, when activated, captures a first video of a first field of view (FOV) a first display spatially associated with the first camera, the first display for displaying video received from a remote site when the first camera is activated, a second camera, which, when activated, captures a second video of a second FOV, a second display spatially associated with the second camera, the second display for displaying video received from the remote site when the second camera is activated, and a processor which controls the first camera, the second camera, the first display, the second display, and a triggering mechanism, wherein the triggering mechanism activates the first camera to capture video in the first FOV, identifies over time if a mode change occurs and upon identifying the mode change, deactivates the first camera and the first display and activates the second camera and the second display. Related apparatus, systems and methods are also described.

16 Claims, 9 Drawing Sheets

(56) References Cited

U.S. PATENT DOCUMENTS

| | | | |
|---|---|---|---|
| 8,587,634 | B1 | 11/2013 | Baldino et al. |
| 8,886,489 | B2 * | 11/2014 | Patel ................... B01D 46/10 |
| | | | 702/1 |
| 2005/0117033 | A1 * | 6/2005 | Matsui ................. H04N 5/262 |
| | | | 348/239 |
| 2006/0064519 | A1 * | 3/2006 | Patterson ............. G06F 3/0227 |
| | | | 710/36 |
| 2008/0297587 | A1 | 12/2008 | Kurtz et al. |
| 2009/0015658 | A1 | 1/2009 | Enstad et al. |
| 2010/0226487 | A1 * | 9/2010 | Harder ................. G06F 1/325 |
| | | | 379/202.01 |
| 2011/0141011 | A1 * | 6/2011 | Lashina ................ G06F 3/013 |
| | | | 345/156 |
| 2012/0001999 | A1 | 1/2012 | Schirdewahn et al. |
| 2012/0050456 | A1 | 3/2012 | Mauchly et al. |
| 2012/0050458 | A1 * | 3/2012 | Mauchly ........... H04N 5/23238 |
| | | | 348/14.16 |
| 2012/0293606 | A1 | 11/2012 | Watson et al. |
| 2013/0335508 | A1 | 12/2013 | Mauchly |
| 2014/0028781 | A1 | 1/2014 | MacDonald |
| 2014/0104374 | A1 | 4/2014 | Buckler |
| 2014/0111600 | A1 | 4/2014 | Schaefer et al. |

OTHER PUBLICATIONS

"Polycom EagleEye Director" available on the web at: http://www.polycom.com/products-services/hd-telepresence-video-conferencing/realpresence-accessories/realpresence-accessories-eagle-eye-director.html#slab1 (2014).

Al-Hames, M. et al; "Automatic Multi-Modai Meeting Camera Selection for Video-Conferences and Meeting Browsers," Multimedia and Expo, 2007 IEEE International Conference on , vol., No., pp. 2074 2077.

MacCormick, John et al; "Video chat with multiple cameras"; In Proceedings of the 2013 conference on Computer supported cooperative work companion (CSCW '13). ACM, New York, NY, USA, pp. 195-198.

Sharer, S.R.; "Essentials of End-User & System-evel Control Design & Programming for Presentation and Video conference: Part 1—The User Level"; Submitted to infocomm.org—Communication Desigen Group Inc. (Jul. 1, 2006).

Shivappa, S.T., et al; "Hierarchical audio-visual cue integration framework for activity analysis in intelligent meeting rooms" in Computer Vision and Pattern Recognition Workshops, 2009. CVPR Workshops 2009, . IEEE Computer Society Conference; vol., No., pp. 107, 114 (Jun. 20, 2009).

* cited by examiner

LINK A PLURALITY OF VIDEO CONFERENCING ENDPOINT UNITS IN A VIDEO CONFERENCE, EACH OF THE VIDEO CONFERENCING UNITS BEING SITUATED IN A LOCATION, WHERE EACH OF THE VIDEO CONFERENCING UNITS INCLUDES AT LEAST TWO CAMERAS, AT LEAST ONE OF WHICH ONE OF WHICH IS AN ACTIVE CAMERA, TWO DISPLAY SCREENS, AND ONE CODEC, WHERE EACH ONE OF THE CAMERAS IS ASSOCIATED WITH A DISPLAY SCREEN

SWITCH THE ACTIVE CAMERA TO BE ONE OF THE AT LEAST TWO CAMERAS THAT BEST CAPTURES ACTIVITY PRESENTLY OCCURRING IN THE LOCATION AND TO MOVE AT LEAST ONE REMOTE VIDEO PARTICIPANT TO THE DISPLAY SCREEN ASSOCIATED WITH THE ACTIVE CAMERA, BY A TRIGGERING MECHANISM IN AT LEAST ONE OF THE LOCATIONS, THE TRIGGERING MECHANISM BEING CONTROLLED BY THE CODEC TO OPERATE, UPON A TRIGGER

METHOD AND SYSTEM FOR VIDEO CONFERENCING UNITS

RELATED APPLICATION INFORMATION

The present application is a continuation application of allowed U.S. Ser. No. 14/669,088, filed on 26 Mar. 2015 and entitled "Method and System for Video Conferencing Units".

TECHNICAL FIELD

The present invention generally relates to video conferencing systems.

BACKGROUND OF THE INVENTION

Video conferencing systems are frequently situated in rooms which often serve as dedicated video conferencing rooms. Such rooms typically house video and teleconferencing equipment, such as, but not limited to video cameras, display screens, audio input equipment, loudspeakers, and a computer operating a "codec" (coder/decoder) system.

BRIEF DESCRIPTION OF THE DRAWINGS

The present invention will be understood and appreciated more fully from the following detailed description, taken in conjunction with the drawings in which:

FIG. 9 is a flowchart of a method of operation of one embodiment described herein.

DESCRIPTION OF EXAMPLE EMBODIMENTS

Overview

A system and method is described, the system and method including a first camera, which, when activated, captures a first video of a first field of view (FOV) a first display spatially associated with the first camera, the first display for displaying video received from a remote site when the first camera is activated, a second camera, which, when activated, captures a second video of a second FOV, a second display spatially associated with the second camera, the second display for displaying video received from a remote site when the second camera is activated, and a processor which controls the first camera, the second camera, the first display, the second display, and a triggering mechanism, wherein the triggering mechanism activates the first camera to capture video in the first FOV, identifies over time if a mode change occurs and upon identifying the mode change, deactivates the first camera and the first display and activates the second camera and the second display. Related apparatus, systems and methods are also described.

Exemplary Embodiments

Figure 1:
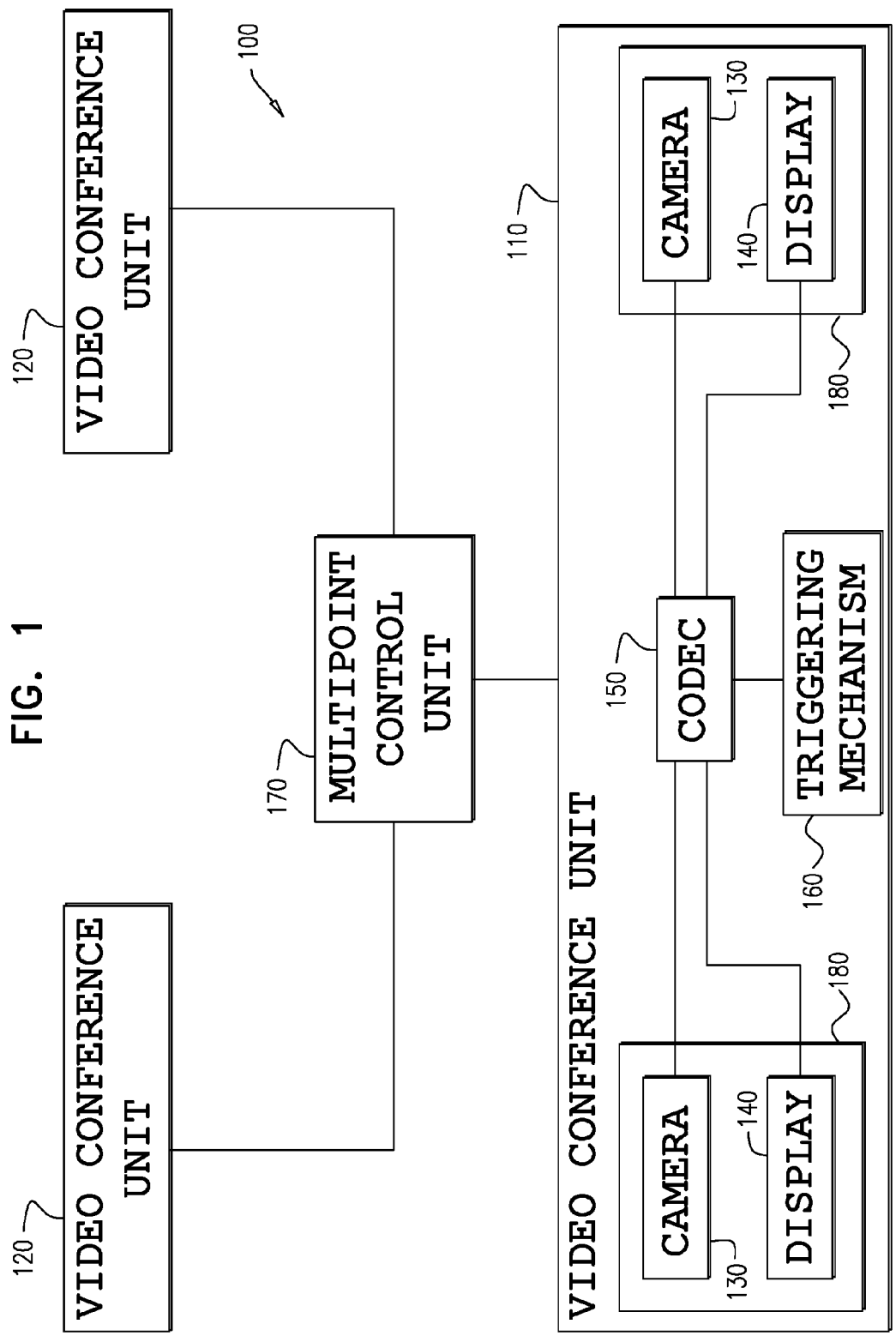
FIG. 1 is a simplified block diagram illustration of a video conferencing system, the video conferencing units being constructed and operative in accordance with an embodiment of the present invention.

Reference is now made to FIG. 1, which is a simplified block diagram illustration of a video conferencing system 100, video conferencing units 110, 120 being constructed and operative in accordance with an embodiment of the present invention. It should be appreciated that video conferencing units 110 and 120 are generally similar. For ease of depiction, only one of the video conferencing units, video conferencing unit 110 is depicted in detail in FIG. 1. The system of FIG. 1 comprises a plurality of video conferencing units 110, 120 linked in a video conference. At least one of the video conferencing units 110, 120 comprises at least:

two cameras 130, one of which is an active camera;
two display screens 140; and
a codec 150.

A remote site served by a video conferencing unit such as one of the video conferencing units 120 will typically be configured similarly to the video conferencing unit 110 with the components described above. Alternatively, remote sites may be conventional video conferencing systems that do not have the functionality described herein. It is also appreciated that one of the video conferencing units may comprise two or more codecs, each one of the two or more codecs being operationally associated with a plurality of display screens and cameras. In such a configuration, the two or more codecs are operationally joined to operate as a single system. Alternatively, one of the one of the video conferencing units 120 may be set up as a single camera, single display conference room setup.

Microphones are distributed throughout a room/location which encompasses one of the video conferencing units 110, 120, as is known in the art. Other standard video conference components, as are known in the art, are also present in the video conferencing units 110, 120, and are not depicted.

Any of the video conferencing units 110, 120 which comprise the components mentioned above (i.e. two cameras 130; two display screens 140; and the codec 150) may also comprise a triggering mechanism 160. The codec 150 (i.e. coder/decoder) typically comprises a data processing unit that ties together the other components (i.e. the cameras 130 and display screens 140), performs compressing and decompressing of video to be transmitted/displayed, and initiates and maintains the data linkage via a network. The codec 150 may also comprise the triggering mechanism 160. Alternatively, the triggering mechanism 160 may be comprised on a separate data processing unit or computer, but in such a case, the triggering mechanism 160 will be controlled by the codec 150. The role of the triggering mechanism 160 in the operation system of FIG. 1 will be explained below.

It is also appreciated that the triggering mechanism 160 is only needed in a room or location that has several display screens 140 and cameras 130. The operation of the system of FIG. 1 is not dependent on having independent triggering mechanisms 160 in each room. The room with the triggering mechanism 160 may receive input from the other sites that will trigger a change, for example, and without limiting the generality of the foregoing, a remote site starting to share a presentation.

The video conferencing units 110, 120 may be linked together in a video conference by a multipoint control unit (MCU) 170. The MCU 170 typically bridges between the video conferencing units 110, 120. The MCU 170, as will be appreciated by those of skill in the art, typically comprises a network endpoint which enables a plurality of video conferencing units 110, 120 to participate in a video conference. Embodiments described herein will also work in a point-to-point video call without an additional MCU 170.

Each one of the cameras 130 is associated with one of the display screens 140, creating an associated camera display screen 180. It is appreciated that the relationship between one of the cameras 130 and one of the display screens 140, described herein as "associating" is created by physically placing the one of the cameras 130 and one of the display screens 140 in proximity of each other, and designating them, in the codec 150 as an associated camera display screen 140.

Figure 2:
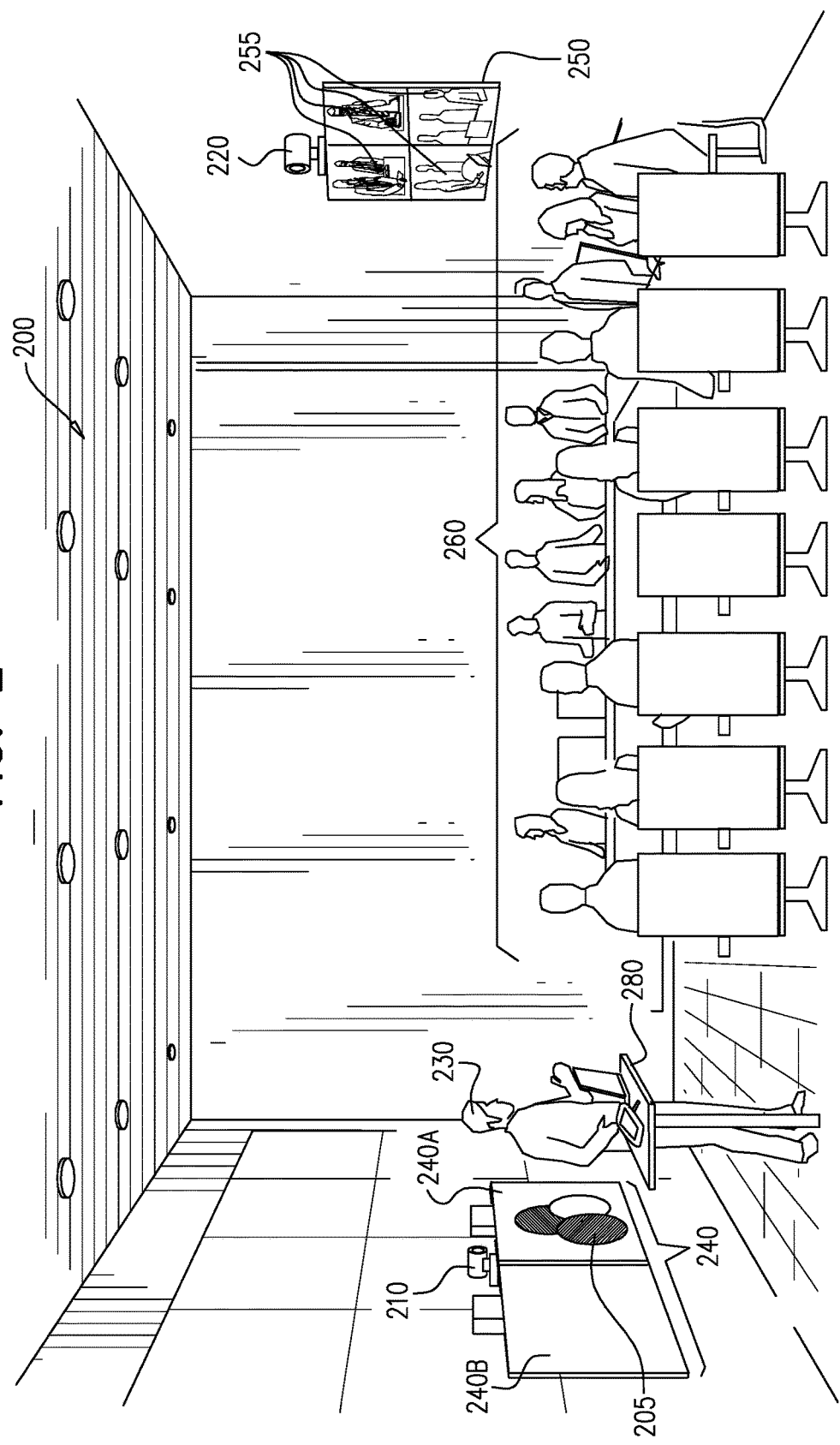
FIG. 2 is a first simplified pictorial illustration of a video conference unit situated in a video conferencing meeting room constructed in accordance with the system of FIG. 1.
Figure 3:
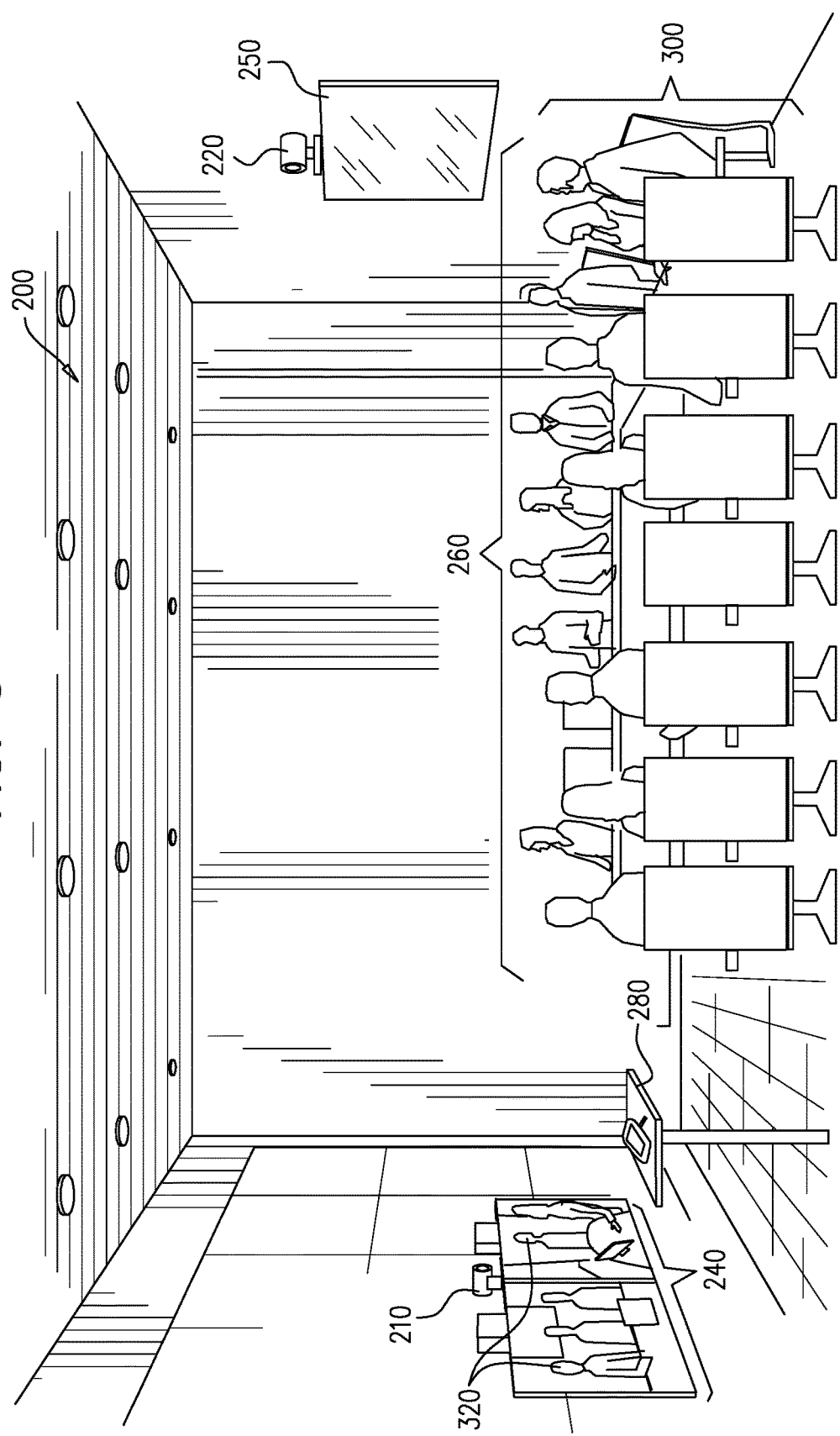
FIG. 3 is a second simplified pictorial illustration of the video conference unit situated in the video conferencing meeting room constructed in accordance with the system of FIG. 1.

Reference is now additionally made to FIGS. 2 and 3, which are a first and second simplified pictorial illustration of a video conference unit 110, 120 (FIG. 1) situated in a video conferencing meeting room 200 for use in the system of FIG. 1. FIGS. 2 and 3 depict how the system of FIG. 1 appears in operation from the point of view of attendees who are present in the meeting room 200. FIG. 2 depicts a situation where a speaker 230 is delivering a presentation 205. FIG. 3 depicts a situation where a "round-table" discussion 300 is in progress.

FIGS. 2 and 3 depict the video conferencing meeting room 200, in which one of the video conferencing units 110, 120 (FIG. 1) is situated. At least two cameras 210, 220 are situated in the video conferencing meeting room 200. (Even in FIG. 3, where the speaker is not physically present, there is a podium 280, that indicates which end of the room 200 is the speaker's end of the room.) The first camera 210 of the at least two cameras 210, 220 may be situated at the speaker's 230 end of the video conferencing meeting room 200. The second camera 220 of the at least two cameras 210, 220 may be situated at the other end of the room (typically distally to the speaker 230).

It is appreciated that embodiments described herein are also relevant in rooms not necessarily dedicated to video conferencing. These embodiments allow for using video conferencing in scenarios that exist today, but are not easily adapted to conventional video conferencing systems/solutions. Some exemplary embodiments of such situations are provided below, with reference to FIGS. 5-8.

Each of the at least two cameras 210, 220 is typically situated in proximity of at least one display screen 240, 250 with which one of the cameras 210, 220 is associated in order to form an associated camera display screen, such as associated camera display screen 180 (FIG. 1). It is appreciated that either one or both of the two display screens 240, 250 may be a complex display screen, comprised of more than one portion of a display screen, such as display screen 240, which is depicted, by way of a non-limiting example, as comprising two portions, i.e. display screen 240A and display screen 240B. For example, in FIGS. 2 and 3 there are two display screens 240 depicted situated at the speaker's 230 end of the video conferencing meeting room 200. The first camera 210 might be associated with one display screen 240A of the two display screens 240, 250 (the second display screen 240B of the two display screens 240 is depicted as inactive in FIG. 2). Similarly, the second camera 220 is associated with the display screen 250 to which it is proximal. The associating is noted in the codec 150 (not depicted in FIG. 2) by associating each of the camera display screen 180 together, such that when one of the cameras is active, its associated display screen will be the display screen on which remote participants of the video conference are displayed.

The meeting occurring as depicted in FIGS. 2 and 3 might be a dynamic meeting. That is to say, for example, as depicted in FIG. 2, and without limiting the generality of the foregoing, as noted above the presenter 230 is speaking from the front of the room 200. A presentation 205 may appear on at least one of a plurality of display screens 240A in the room 200. Alternatively (as depicted in FIG. 3), all of the participants 260 present in the room 200 in the meeting might be seated and the meeting occurring in a round-table fashion 300.

The triggering mechanism 160 (FIG. 1) will, upon detection of a trigger (discussed below), switch the active camera, such as active camera 220 (as depicted in FIG. 2), to be another camera, such as camera 210 (as depicted in FIG. 3), situated in the video conferencing meeting room 200. By way of example, the speaker 230 (and the speaker's presentation 205, on display screen 240A) in FIG. 2 is the focus of attention of participants (both the remote participants 255 and the local participants 260) in the meeting. The second camera 220 is therefore the active camera, and display screen 250, which is proximate to the second camera 220, displays the remote video participants 255. Since the camera 220 which is distally situated to the speaker (i.e. the active camera) is situated so as to be facing the speaker, this arrangement facilitates the speaker's 230 facing and appearing to maintain eye contact with the remote participants 255 in the meeting, as well as with the local participants 260.

It is appreciated that the display screen 250, which is proximate to the second (i.e. the active) camera 220 (in FIG. 2), is situated for the convenience of the speaker 230. There might be another display screen, such as display screen 240B, which also displays the remote participants for the benefit of the local participants 260.

FIG. 3, by contrast to FIG. 2, depicts the participants 260 in the meeting as seated and the meeting is occurring in a round-table fashion 300. The transition between the situation depicted in FIG. 2 and FIG. 3 (in either the transition from the situation depicted in FIG. 2 to the situation depicted in FIG. 3, or vice-versa, i.e. the situation depicted in FIG. 3 to the situation depicted in FIG. 2) is detected by the triggering mechanism 160. The triggering mechanism 160 (see FIG. 1) is operative to determine when at least one of the following occurs:

the speaker 230 begins a presentation at the podium 280 (detected, for instance, by one of the microphones distributed throughout a room/location, or, alternatively, when it is detected that a video or audio cable is connected to a computer associated with and/or situated at the podium 280, and a video or audio signal is sent). Still further alternatively, rather than physically connecting a cable to the computer associated with and/or situated at the podium 280, the speaker may connect to the computer associated with and/or situated at the podium 280 via a Bluetooth, WiFi, infrared, ultrasound or other wireless connection in order to trigger the triggering mechanism 160;

a face detection mechanism detects a face at the podium 280;

a voice detection or voice position detection unit determines where to focus the active camera 210, 220;

a physical object (i.e. a material thing of sufficient size so that the active camera may use the object as a focal point) at the podium 280 is detected by a detection mechanism;

a remote site starts sharing of a presentation;

manual actuation of a control, such as actuation of a pressure mat or a look-at-me button at the podium 280; and a change of a video layout in the location or video conferencing room. Specifically, in a conventional video system, layout change means changing the appearance of different sites on available screens. The camera to be used has to be manually selected. As used in the embodiments described herein, by contrast, the layout change is additionally utilized in order to trigger an automatic switch to the appropriate camera.

It is appreciated that the list of triggers above is by way of example, and the triggering mechanism 160 may be triggered by other triggers not mentioned above.

Figure 4:
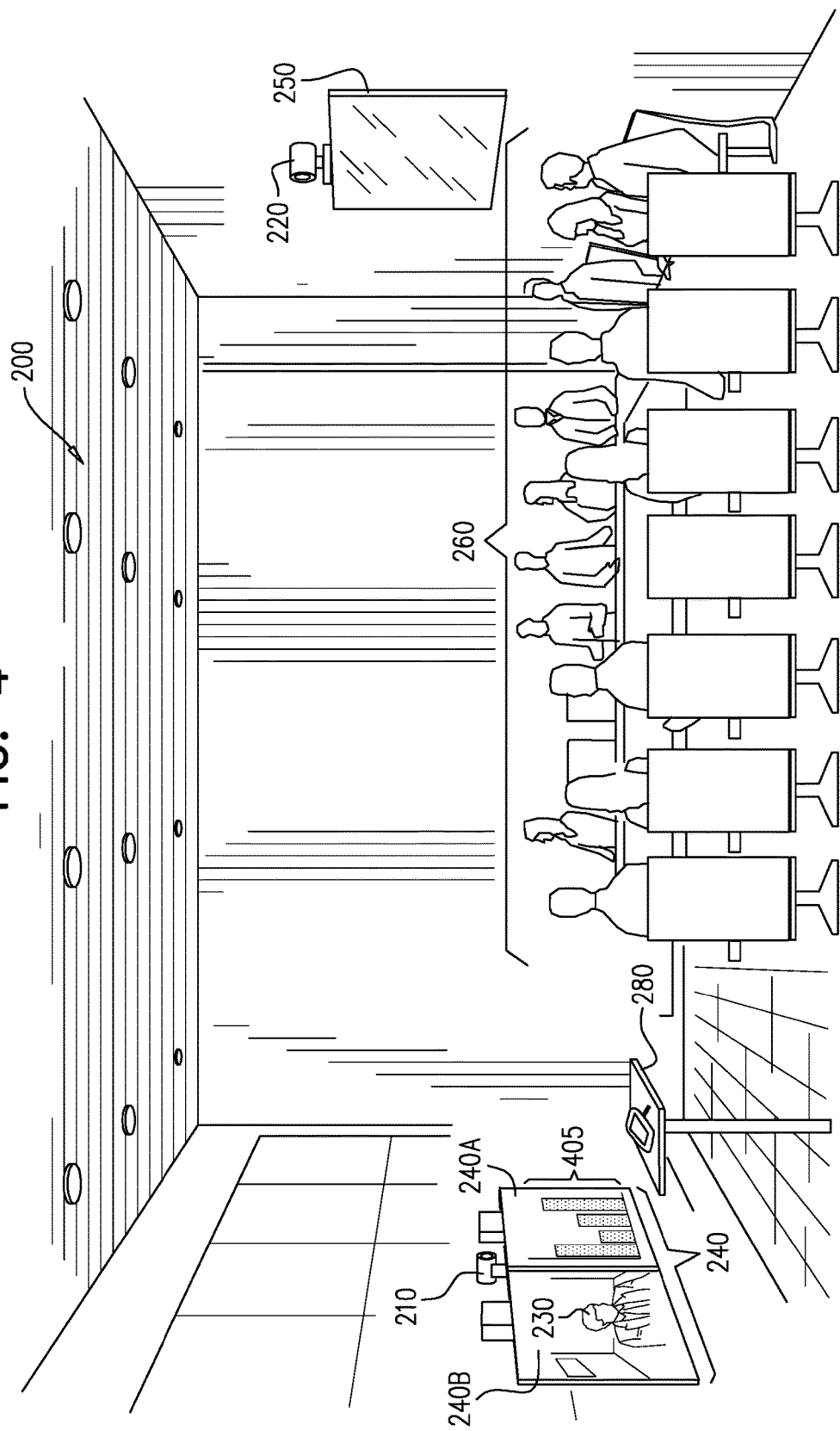
FIG. 4 is a third simplified pictorial illustration of the video conference unit situated in the video conferencing meeting room constructed in accordance with the system of FIG. 1, with participants viewing a remote presentation.

Reference is now made additionally to FIG. 4, which is a third simplified pictorial illustration of the video conference unit situated in the video conferencing meeting room 200 with local participants 260 viewing a remote presentation 405, for use in the system of FIG. 1. The presenter 230 appears on screen 240B and the presentation 405 appears on screen 240A, so that the local participants 260 are facing the presenter 230 and the presentation 405. The active camera 210 would, in this case, be the camera located proximally to screen 240. Thus, the local participants 260 are looking in the direction of the presentation 405 and also the presenter 230. That is to say it is the camera 210 which local participants 260 are facing.

It is appreciated that the scenario depicted in FIG. 4 corresponds to what the remote participants 255 in FIG. 2 would view.

In some more complex embodiments than those depicted in FIGS. 2-4, there might be a presentation 205, 405 which is presented by more than one speaker 230 who are located in different video conferencing meeting rooms 200. In such a case, the triggering mechanism 160 (FIG. 1) would then manage which of the cameras 210, 220 would become the active camera in the different video conferencing meeting rooms 200 participating in the video conference.

The following discussion of FIGS. 5-8 describes various embodiments in environments and locations which differ from the environment described with reference to FIGS. 2-4 (i.e. the conference room 200). Many of the details described above, therefore, are relevant to the discussion below, and, for the sake of brevity are not repeated.

Figure 5:
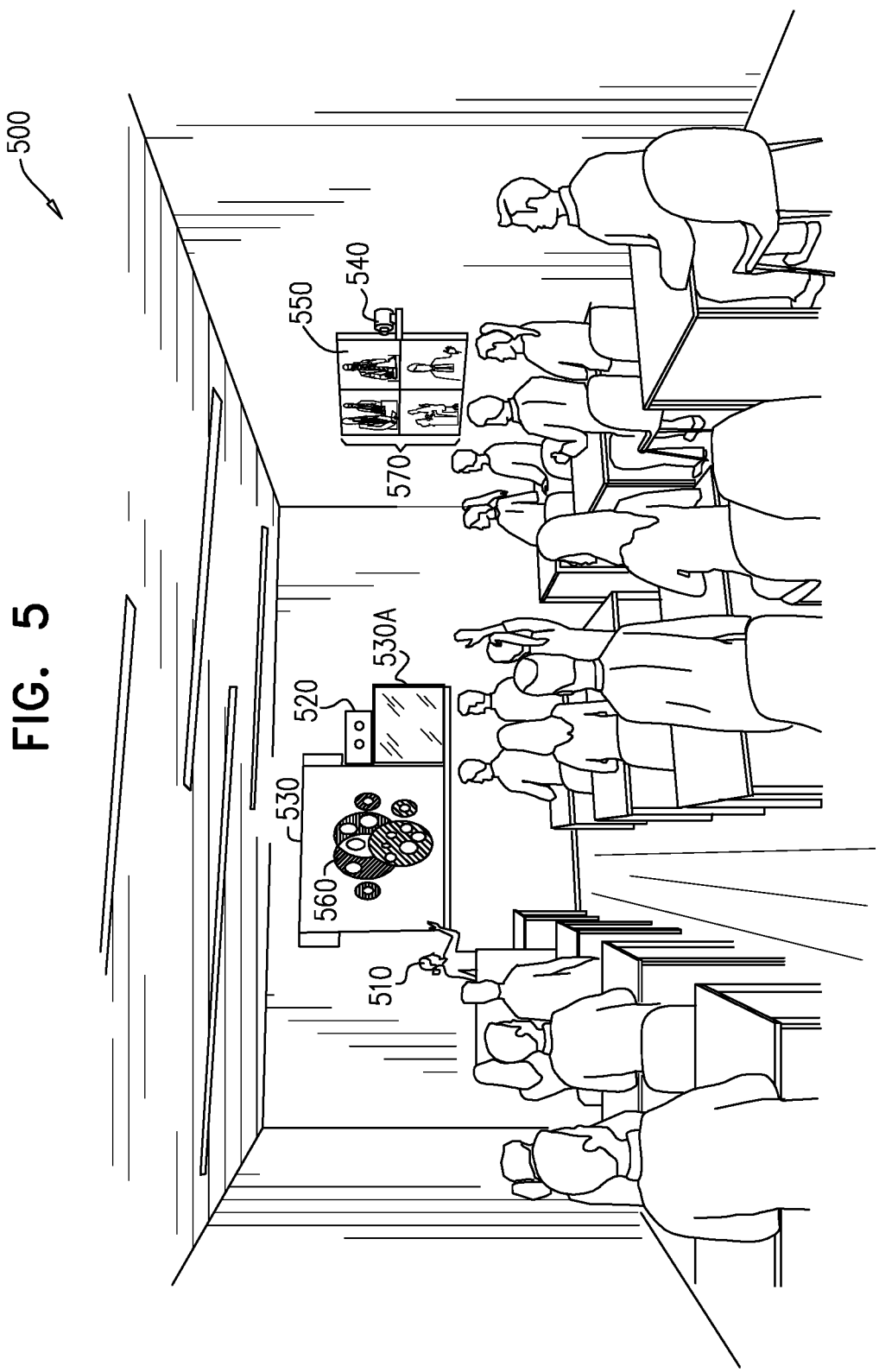
FIGS. 5 and 6 are simplified pictorial illustrations of a classroom equipped with a video conference unit, the classroom constructed in accordance with the system of FIG. 1.
Figure 6:
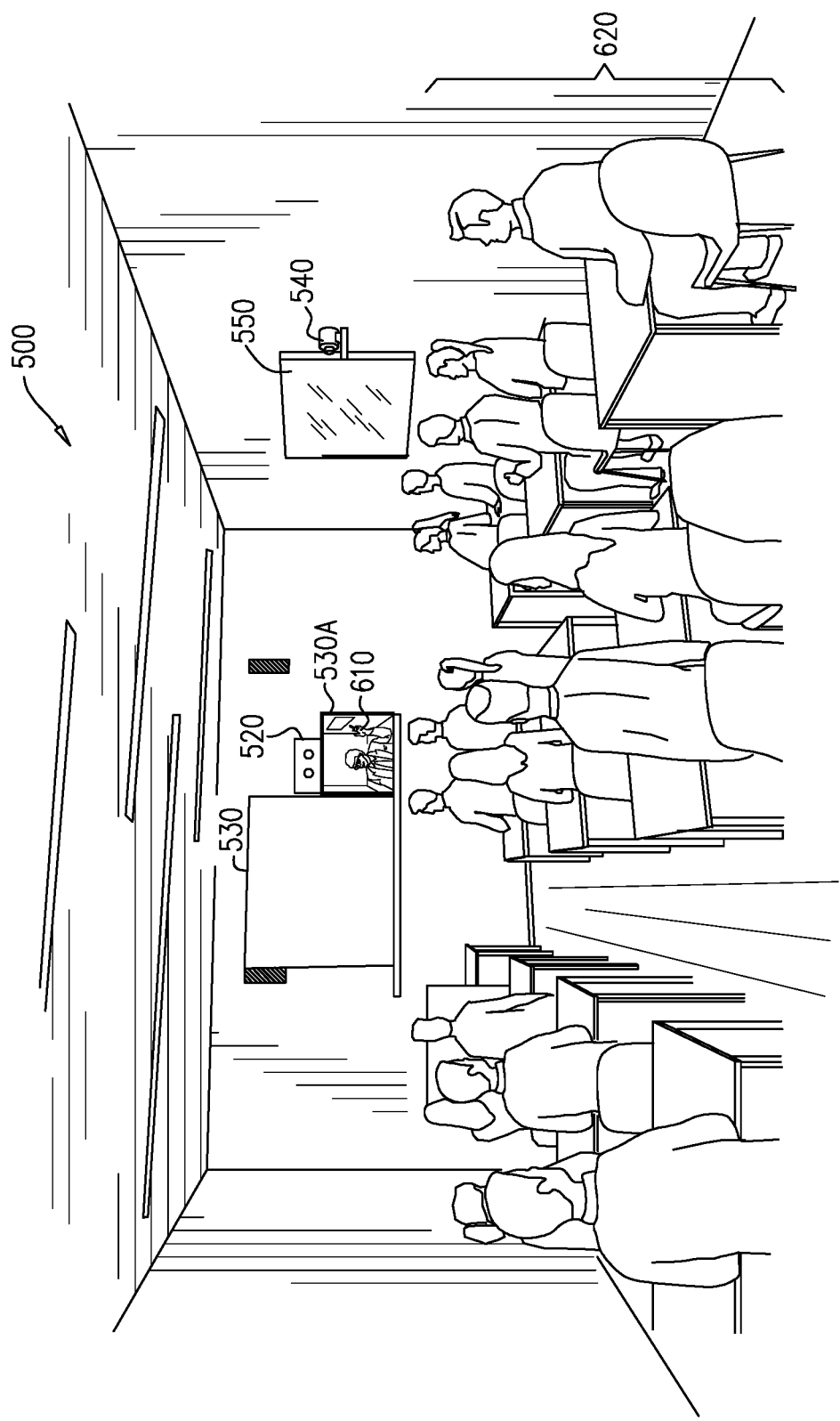

Reference is now made to FIGS. 5 and 6, which are simplified pictorial illustrations of a classroom 500 equipped with a video conference unit, constructed in accordance with the system of FIG. 1. FIG. 5 shows the classroom 500 with a local presenter 510. FIG. 6 shows the classroom with a remote presenter 610.

The classroom 500 is equipped with at least two cameras. A first camera 520 is located at the front of the room, behind the local presenter 510 of FIG. 5. The first camera 520 is associated with a first compound display screen 530, 530A. A second camera 540 is located across from the front of room, or, at an appropriate angle, on a side wall. A second display screen 550 is in proximity with and associated with the second camera 540.

In FIG. 5, the local presenter 510 is situated at the front of the room, and a presentation 560 given by the local presenter 510 appears on the first display screen 530. The second camera 540 is, as explained above, the active camera. Remote participants 570 appear on the second screen 550. In this case, the local presenter 510 is situated so that he or she is facing the second screen 550, and therefore the remote participants 570.

In FIG. 6, the remote presenter 610 appears on a portion of the first display screen 530A. If the remote presenter 610 is presenting a presentation, the presentation would appear on another portion of the first display screen 530. Because the presenter is a remote presenter 610, the active camera is the camera 520 which is situated at the front of the classroom 500. In this case, the remote presenter 610 appears on a frontally disposed display screen, that is, the first display screen 530. Accordingly, the first display screen 530 is situated so that it appears that the remote presenter 610 is facing the local participants 620. Similarly, the remote presenter 610 sees the local participants 620 as if they are looking directly at him or her.

Figure 7:
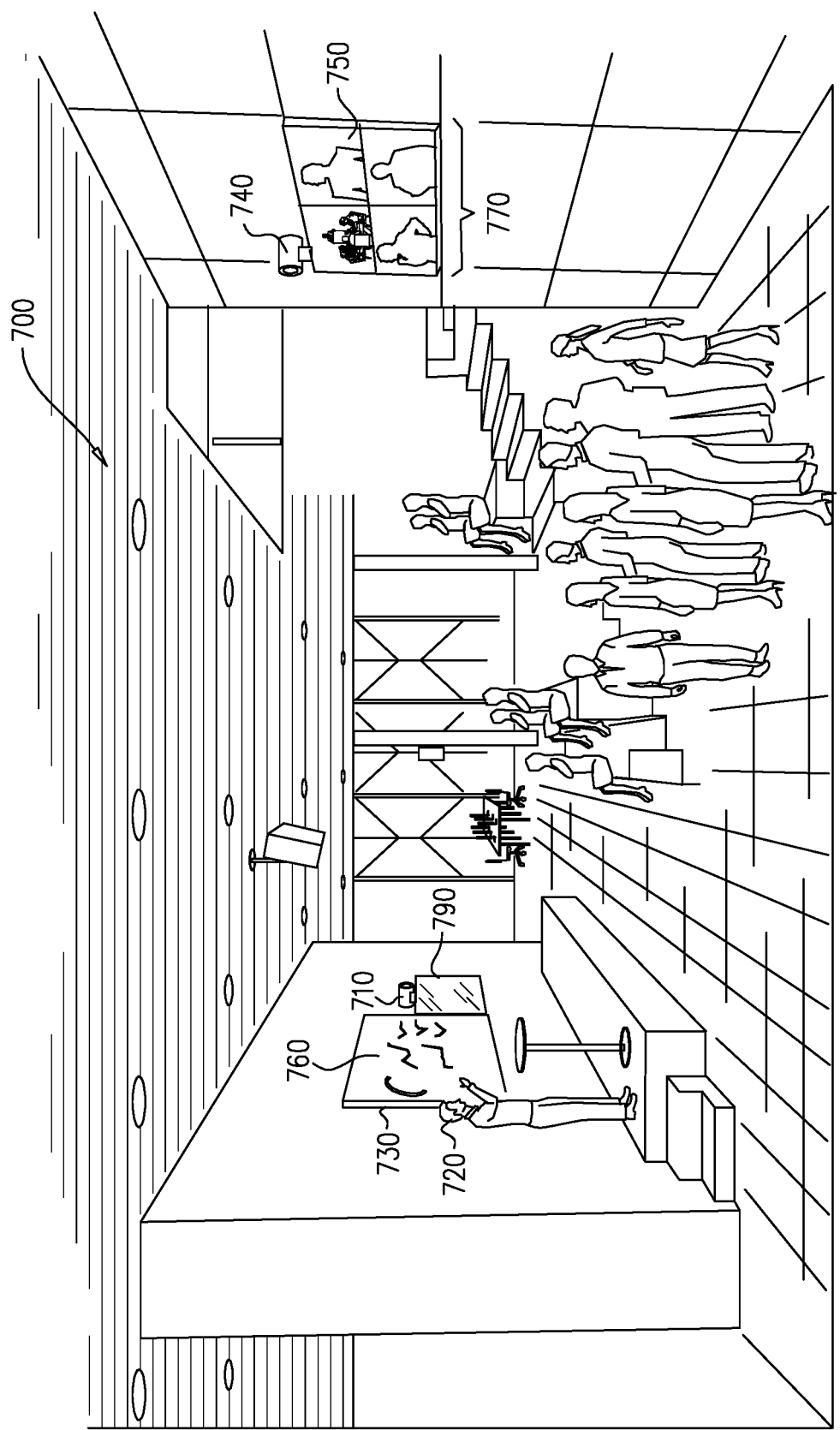
FIGS. 7 and 8 are simplified pictorial illustrations of a large meeting hall equipped with a video conference unit, the meeting hall constructed in accordance with the system of FIG. 1.
Figure 8:
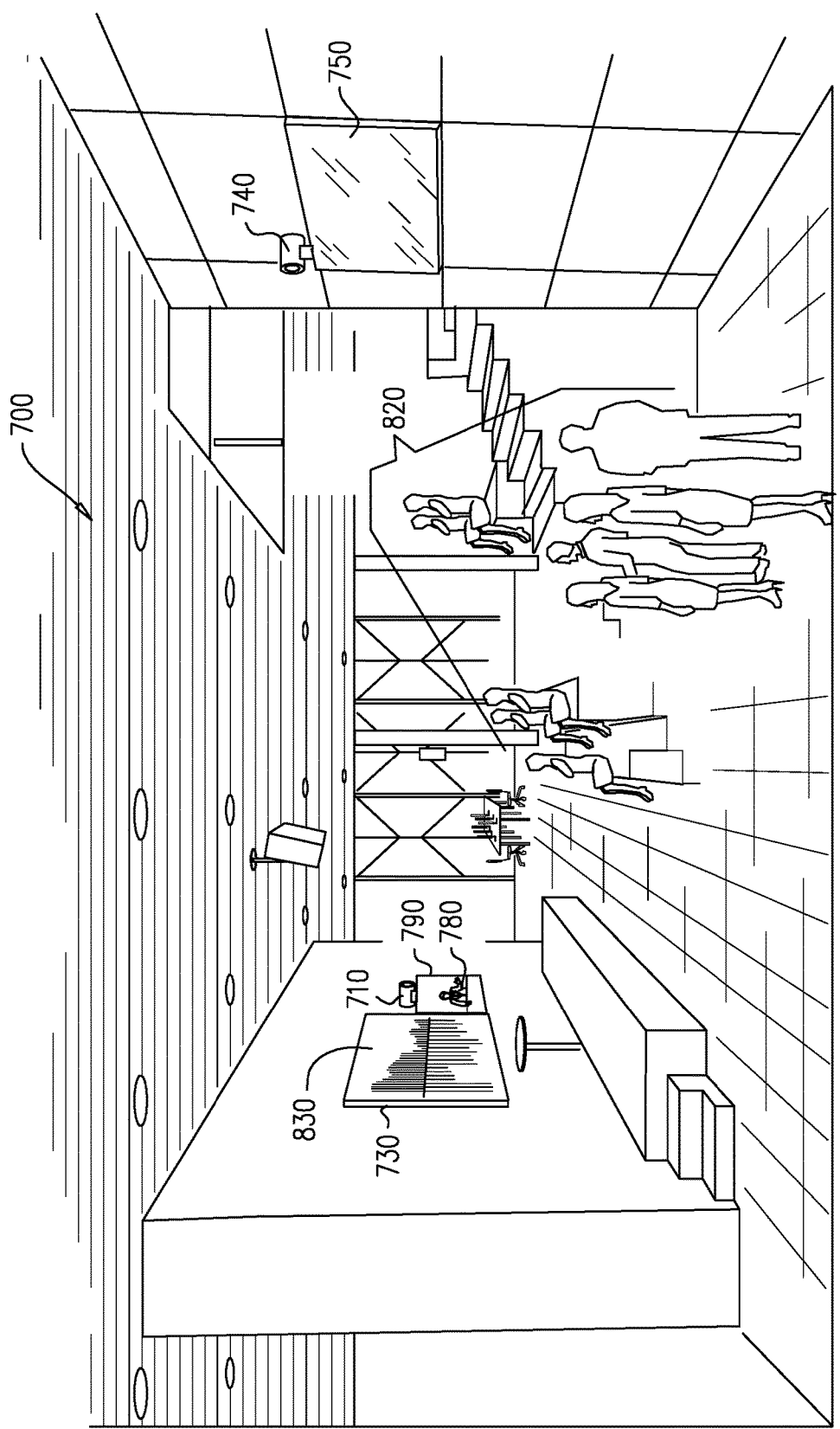

Reference is now made to FIGS. 7 and 8, which are simplified pictorial illustrations of a large meeting hall 700 equipped with a video conference unit, constructed in accordance with the system of FIG. 1.

The large meeting hall 700 is equipped with at least two cameras. A first camera 710 is located at the front of the room, behind the local presenter 720. The first camera 710 is associated with a first display screen 730. A second camera 740 is located across from the front of room. A second display screen 750 is in proximity with and associated with the second camera 740.

In FIG. 7, the local presenter 720 is situated at the front of the large meeting hall 700, and a presentation 760 given by the local presenter 720 appears on the first display screen 730. The second camera 740 is, as explained above, the active camera. Remote participants 770 appear on the second screen 750. In this case, the local presenter 720 is situated so that he or she is facing the second screen 750, and therefore the remote participants 770.

In FIG. 8, the remote presenter 780 appears on a portion of the first display screen 790. If the remote presenter 780 is presenting a presentation 830, the presentation would appear on another portion of the first display screen 730. Because the presenter is a remote presenter 780, the active camera is the camera 710 which is situated at the front of the large meeting hall 700. In this case, the remote presenter 780 appears on a frontally disposed display screen i.e. display screen 790. Accordingly, the display screen 790 is situated so that it appears that the remote presenter 780 is facing the local participants 820. Similarly, the remote presenter 780 sees the local participants as if they are looking directly at him or her.

As was noted above, transitions between the various situations depicted in FIGS. 5-6 and 7-8 occur in response to a trigger, which triggers the triggering mechanism 160 (FIG. 1).

It is appreciated that in the above examples, one camera is depicted as active, and a second camera is depicted as inactive. In some embodiments, there may be more than two cameras present in the location in which one or more of the video conferencing units are situated, and two or more of those cameras may be active cameras. In such a case, the codec will tag each video stream, in order to distinguish between the video stream focusing on the presenter and the video stream focusing on the audience.

Reference is now made to FIG. 9, which is a simplified flow chart of one embodiment described herein. The method of FIG. 9 is believed to be self-explanatory with reference to the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. An apparatus comprising:
a first camera, the activation of which, captures a first video of a first field of view (FOV);
a first display proximally associated with the first camera, the first display for displaying video received from a remote site upon activation of the first camera;
a second camera, the activation of which, captures a second video of a second FOV;
a second display proximally associated with the second camera, the second display for displaying video received from the remote site upon activation of the second camera, wherein the second display and the first display are located in different portions of a video conferencing meeting room; and
a processor which controls:
the first camera;
the second camera;
the first display;
the second display; and
a triggering mechanism,
wherein the triggering mechanism activates the first camera to capture video in the first FOV, and, upon identifying a trigger, deactivates the first camera and the first display and activates the second camera and the second display.

2. The apparatus according to claim 1 wherein the triggering mechanism identifies the trigger upon a detection of a signal input to a media input port.

3. The apparatus according to claim 1 wherein the triggering mechanism comprises a face detection mechanism which detects a face within a predefined area in proximity of a speaker stand, the detection of the face within the predefined area in proximity of the speaker stand comprising the trigger.

4. The apparatus according to claim 1 wherein the triggering mechanism comprises a voice detection mechanism which detects a voice in proximity of a speaker stand, the detection of the voice in proximity of the speaker stand comprising the trigger.

5. The apparatus according to claim 1 wherein the triggering mechanism comprises a detection mechanism which detects a physical object within a predefined area in proximity of a speaker stand, the detection of the physical object within the predefined area in proximity of the speaker stand comprising the trigger.

6. The apparatus according to claim 1 wherein the triggering mechanism comprises a detection mechanism which detects starting of sharing of a presentation at a remote site, the sharing of the presentation at the remote site comprising the trigger.

7. The apparatus according to claim 1 wherein the triggering mechanism comprises detection of an actuation of a pressure mat or a look-at-me button at a speaker stand, the detection of the actuation of the pressure mat or the look-at-me button at the speaker stand comprising the trigger.

8. The apparatus according to claim 1 wherein the triggering mechanism comprises detection of a change of a video layout, the detection of the change of the video layout comprising the trigger.

9. A method comprising:
capturing a first video of a first field of view (FOV) upon activation of a first camera;
displaying video received from a remote site on a first display which is proximally associated with the first camera, upon activation of the first camera;
capturing a second video of a second field of view (FOV) upon activation of a second camera;
displaying video received from the remote site on a second display which is proximally associated with the second camera, upon activation of the second camera, wherein the second display and the first display are located in different portions of a video conferencing meeting room; and
activating, by a processor comprising a triggering mechanism, the first camera, to capture video in the first FOV;
identifying a trigger; and
upon identifying the trigger, deactivating, by the processor, the first camera and the first display; and
activating the second camera and the second display.

10. The method according to claim 9 wherein the triggering mechanism identifies the trigger upon detection of a signal input to a media input port.

11. The method according to claim 9 wherein the triggering mechanism comprises a face detection mechanism which detects a face within a predefined area in proximity of a speaker stand, the detection of the face within the predefined area in proximity of the speaker stand comprising the trigger.

12. The method according to claim 9 wherein the triggering mechanism comprises a voice detection mechanism which detects a voice in proximity of a speaker stand, the detection of the voice in proximity of the speaker stand comprising the trigger.

13. The method according to claim 9 wherein the triggering mechanism comprises a detection mechanism which detects a physical object within a predefined area in proximity of a speaker stand, the detection of the physical object within the predefined area in proximity of the speaker stand comprising the trigger.

14. The method according to claim 9 wherein the triggering mechanism comprises a detection mechanism which detects starting of sharing of a presentation at a remote site, the sharing of the presentation at the remote site comprising the trigger.

15. The method according to claim 9 wherein the triggering mechanism comprises detection of an actuation of a pressure mat or a look-at-me button at a speaker stand, the detection of the actuation of the pressure mat or the look-at-me button at the speaker stand comprising the trigger.

16. The method according to claim 9 wherein the triggering mechanism comprises detection of a change of a video layout, the detection of the change of the video layout comprising the trigger.

* * * * *

UNITED STATES PATENT AND TRADEMARK OFFICE
CERTIFICATE OF CORRECTION

| | | |
|---|---|---|
| PATENT NO. | : 9,712,785 B2 | Page 1 of 1 |
| APPLICATION NO. | : 15/155020 | |
| DATED | : July 18, 2017 | |
| INVENTOR(S) | : Kristian Sandvik et al. | |

It is certified that error appears in the above-identified patent and that said Letters Patent is hereby corrected as shown below:

On the Title Page

Item (45), Date of Patent, Column 2, "Jul. 18, 2017" to read as --*Jul. 18, 2017--.

Item (74), Name of the Attorney, Column 2, Line 1, "Samual" to read as --Samuel--.

On Page 2, Item (56), Other Publication, Column 2, Line 5 approx., "Modai" to read as --Modal--.

On Page 2, Item (56), Other Publication, Column 2, Line 13 approx., "evel" to read as --level--.

On Page 2, Item (56), Other Publication, Column 2, Line 16 approx., "Desigen" to read as --Design--.

In the Drawings

Sheet 9 of 9, Fig. 9, Line 5, "ONE OF WHICH ONE OF WHICH" to read as --ONE OF WHICH--.

In the Specification

Column 3, Line 14, "camera display" to read as --"camera-display"--.

Column 3, Line 20, "camera display" to read as --"camera-display"--.

Column 3, Line 54, "camera display" to read as --"camera-display"--.

Column 3, Line 55, "camera display" to read as --"camera-display"--.

Column 4, Line 3, "camera display" to read as --"camera-display"--.

Signed and Sealed this
Twenty-sixth Day of September, 2017

Joseph Matal
*Performing the Functions and Duties of the
Under Secretary of Commerce for Intellectual Property and
Director of the United States Patent and Trademark Office*